F. R. NEFF.
HOSE.
APPLICATION FILED APR. 4, 1911.
1,026,598.
Patented May 14, 1912.
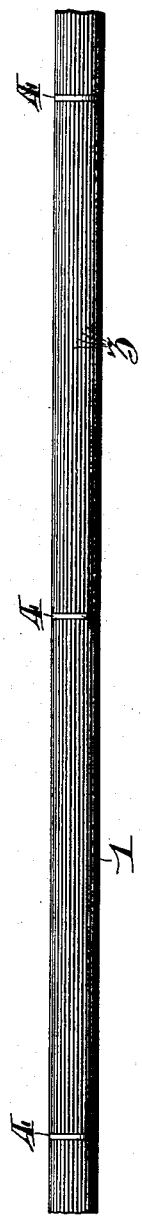
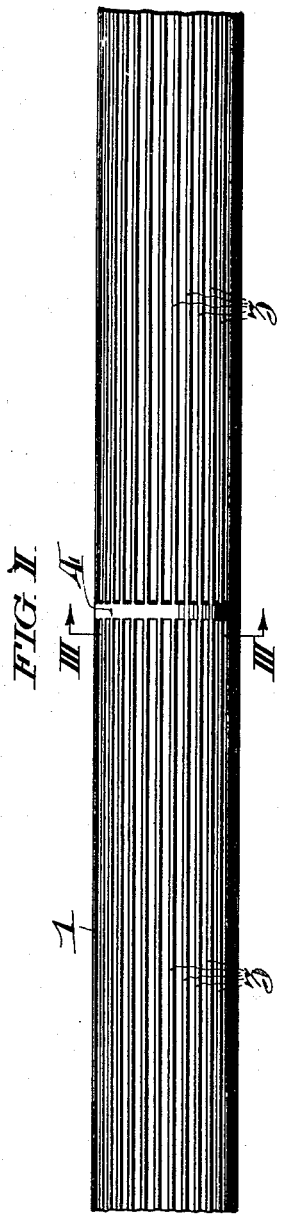
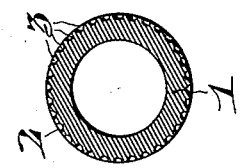
Witnesses
John C. Berguer
James H. Bell
Inventor
Frank R. Neff,
by Jelley + Paul
Attorneys

UNITED STATES PATENT OFFICE.

FRANK R. NEFF, OF PHILADELPHIA, PENNSYLVANIA, ASSIGNOR TO CHARLES A. DANIEL, OF PHILADELPHIA, PENNSYLVANIA.

HOSE.

1,026,598.  Specification of Letters Patent.  Patented May 14, 1912.

Application filed April 4, 1911. Serial No. 618,824.

*To all whom it may concern:*

Be it known that I, FRANK R. NEFF, of Philadelphia, in the county of Philadelphia and State of Pennsylvania, have invented certain new and useful Improvements in Hose, whereof the following is a specification, reference being had to the accompanying drawings.

The invention relates to a hose and more especially to a construction of hose having an outer covering of rubber.

An object of the invention is to construct the rubber outer surface of the hose so as to strengthen the same against lateral strains, and also against surface wear and to further provide a convenient means for indicating definite lengths of hose.

In the drawings, which show by way of illustration, one embodiment of the invention, Figure I, is a plan view showing a length of hose having the improvements applied thereto. Fig. II, is a similar enlarged view of the small section of the hose. Fig. III, is a sectional view on the line III, III.

The hose as herein shown is formed with a circular body portion 1, which may be made up of layers of rubber and fabric or in any other desired way. The outer surface 2 of the hose is formed of rubber. Extending longitudinally of the hose are a plurality of ribs 3, which are closely spaced so as to form corrugations extending longitudinally of the hose. The outer faces of the ribs form the outer cylindrical surfaces of the hose. These longitudinal ribs terminate in annular sections 4, which are equally spaced along the longitudinal length of the hose. The distance between the annular sections 4, 4, may be of any desired unit of linear measure, preferably said sections are spaced twelve inches apart, so as to form visible indications of foot lengths of hose. It is obvious, however, that these annular sections may be spaced a fractional part of a foot, or may be located any definite number of feet apart. The essential feature being that said sections shall be located some linear unit of measure apart, so that by inspection the definite lengths of hose may be readily determined.

Each of the annular sections are so constructed that the outer surface thereof and the outer surface of the longitudinal ribs shall be substantially in alinement so that the outer surface of the entire hose is substantially one continuous cylindrical surface.

The annular sections not only serve to indicate definite lengths of hose, but aid greatly in laterally strengthening the hose. These annular sections tie together the ribs at their ends so that when the hose is bent laterally, the strain on one rib is to a certain extent conveyed to the next adjacent rib, and by thus distributing the strain over a plurality of ribs, the hose is greatly strengthened against these lateral strains, which tend to bend or break the hose. Furthermore, by forming the outer surface of the hose with the longitudinal ribs, the surface wear on the hose in moving the same about is taken up by the longitudinal ribs and the life of the hose is considerably lengthened. Then again, by forming the hose with the annular sections above described, when the hose is cut close to one of these sections, it is reinforced at the end of the cut portion, so that when the couplings are inserted in the hose, there is little or no liability of splitting the same.

By the above construction, it will be therefore noted that a hose is formed wherein the rubber outer surface is so shaped as to greatly strengthen the hose against lateral strains and to increase the life of the hose as to surface wear, and furthermore a visible indication is provided whereby definite lengths of hose may be quickly determined.

It is obvious that slight changes in the form of the longitudinal ribs and the construction of the annular section may be made without departing from the spirit of the invention as set forth in the appended claims.

Having thus described my invention, I claim:

A hose comprising an outer covering of rubber having longitudinally extending closely spaced ribs forming corrugations extending longitudinally of the hose, said ribs terminating in solid annular sections, equally spaced along said hose, the outer faces of said ribs and the outer faces of said annular sections being substantially in alinement.

In testimony whereof, I have hereunto signed my name at Philadelphia, Pennsylvania, this first day of April, 1911.

FRANK R. NEFF.

Witnesses:
JAMES H. BELL,
E. L. FULLERTON.